US005613402A

United States Patent [19]
Gauger et al.

[11] Patent Number: 5,613,402
[45] Date of Patent: Mar. 25, 1997

[54] ADJUSTABLE SET BEARING

[75] Inventors: Derek K. Gauger, Ann Arbor; Kirk K. Horvet, Royal Oak, both of Mich.

[73] Assignee: ITT Automotive, Inc., Auburn Hills, Mich.

[21] Appl. No.: 468,433

[22] Filed: Jun. 6, 1995

[51] Int. Cl.$^6$ .............................. F16H 1/16; F16H 55/22; A47C 1/024
[52] U.S. Cl. ..................... 74/425; 74/89.14; 74/400; 248/394; 248/429; 384/249; 384/264
[58] Field of Search .................. 74/89.14, 400, 74/425; 248/394, 429; 297/330; 384/249, 264

[56] References Cited

U.S. PATENT DOCUMENTS

| | | | |
|---|---|---|---|
| 997,919 | 7/1911 | Jones | 74/400 |
| 1,327,567 | 1/1920 | Miles | 74/425 X |
| 1,551,017 | 8/1925 | Erway | 384/249 |
| 2,536,920 | 1/1951 | Ducanis | 74/425 |
| 2,851,137 | 9/1958 | Gravenstine | 74/425 X |
| 5,224,749 | 7/1993 | Gauger et al. | 248/429 X |
| 5,295,730 | 3/1994 | Rees | 297/361.1 |
| 5,303,983 | 4/1994 | Gauger et al. | 297/472 |
| 5,316,258 | 5/1994 | Gauger et al. | 248/548 |
| 5,398,904 | 3/1995 | Rees | 248/429 |

Primary Examiner—Allan D. Herrmann
Attorney, Agent, or Firm—Thomas N. Twomey; J. Gordon Lewis

[57] ABSTRACT

An adjustable set bearing for a gear assembly for a power seat adjuster on a vehicle, wherein the gear assembly couples a motor output shaft to a lead screw. The gear assembly is contained in a housing assembly and includes a first gear rotatably mounted to the housing and having connecting means to the motor output shaft. The first gear has end journals and a worm disposed therebetween. A second gear is carried for rotation on the lead screw and is in meshing engagement with the first gear. The housing assembly includes adjustable supporting means for supporting an end journal. The adjustable supporting means includes an adjustable set bearing that is threadably insertable into an access port into contact with an end journal. The adjustable set bearing has an inner smooth concentric surface for supporting an end journal of the worm and allowing rotatable movement of the end journal. An outer surface of the adjustable set bearing is threaded while an inner cylindrical access port is also threaded for selectable adjustment of the set bearing within the access port.

20 Claims, 3 Drawing Sheets

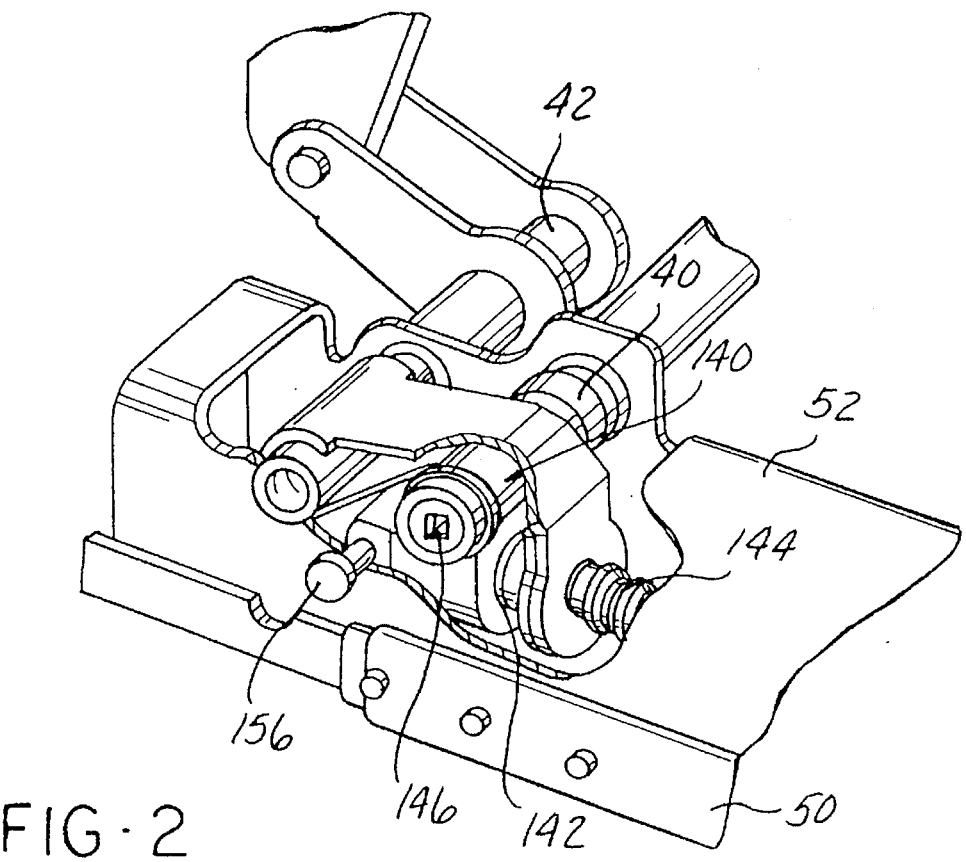
FIG·2
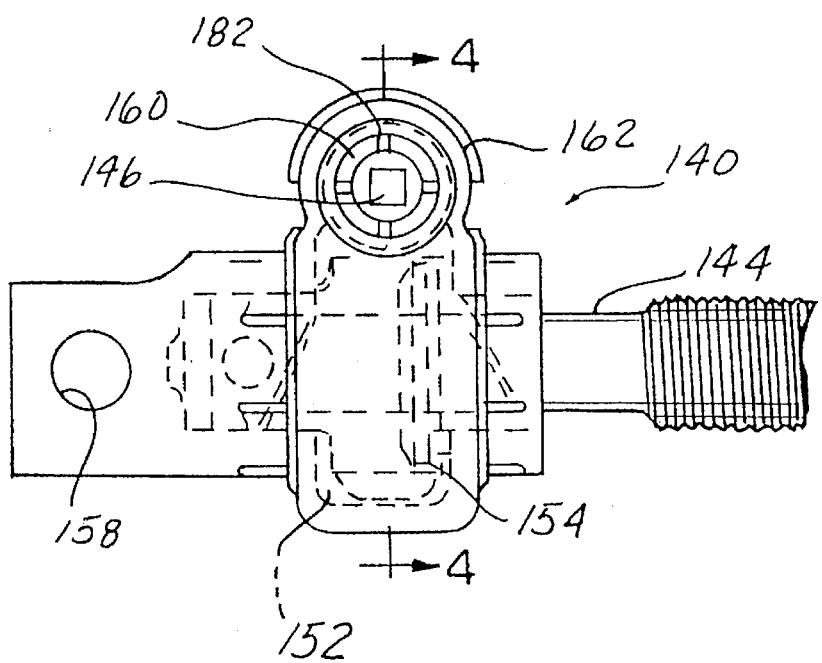
FIG·3

ADJUSTABLE SET BEARING

FIELD OF THE INVENTION

The present invention relates to an adjustable bearing for a gear assembly for seats, and more specifically to an adjustable bearing used on power seat adjusters for automobile seats.

BACKGROUND OF THE INVENTION

Power seat adjusters are a popular option on many automotive vehicles and are frequently offered as standard equipment on higher priced vehicles. Such power seat adjusters are primarily used on the driver's seat and, sometimes, on the front passenger seat of the vehicle.

Such power seat adjusters carry an upper support frame which supports the seat bottom and sometimes the seat back of the vehicle seat. The upper support frame is mounted in first and second, spaced track assemblies, each formed of an upper track which is connected to the upper support frame and which is slidably mounted in a lower track anchored to the vehicle floor. A drive mechanism, typically formed of a bi-directional electric motor mounted on the power seat adjuster rotates a pair of drive shafts extending outward from the motor to a gear assembly mounted in each upper track. In one arrangement, the gear assembly rotates a lead screw extending below each upper track. A drive block mounted to the lower track threadingly receives the lead screw to cause reciprocal movement of the upper track and the attached upper support frame upon selective energization of the drive motor.

As the various drive motors are mounted between the track assemblies, the drive motor output shaft and the drive shaft connected thereto are typically oriented perpendicularly to the axis of the associated lead screw. In order to transmit rotation and drive force between the output shaft of the drive motor and the drive shaft connected thereto to the 90° of set lead screw, each gear assembly typically includes a worm gear which is insert molded on one end of the associated lead screw. A worm is rotatably mounted in the gear assembly housing in meshing-engagement with the worm gear and is connected to one of the drive motor output shafts or to one of the drive shafts so to rotate the worm gear and thereby the lead screw upon bi-directional energization of the selective drive motor. Thus, each drive motor requires a separate gear assembly for each lead screw driven by the drive motor.

In particular, the horizontal drive mechanism employed to reciprocally move each upper track within a lower track typically includes a gear assembly attached to the upper track and coupled to the output shaft of a horizontal drive motor to transmit rotation of the output shaft of the drive motor to rotation of the lead screw which, through threading interaction with the drive block attached to the lower track results in a sliding movement of the upper track with respect to the associated lower track.

The metal to metal contact of the gears may generate undesirable noise and can create vibrations which are transmitted through the metal components of the power seat adjuster directly to the user of the seat. In addition, the worm within the housing of the assembly may further enhance the noise vibration by its lateral movement within the housing. To alleviate the noise resulting from lateral movement of the worm within the housing, a set screw was externally attached to the housing at one of the open ports to the worm. The set screw eliminated lateral movement of the worm, but at the same time prevented access for adjustment or attachment to the worm at that port.

It is desirable to provide a gear assembly for a power seat adjuster which minimizes noise and vibrations generated by lateral movement of the worm in the gear housing. It is further desirable to provide a bearing device for a journal of the worm such that an exterior access is provided to the worm. It is also desirable to provide a device that allows access for an adjustment to remove lateral movement in the worm. Finally, it is desirable to provide a gear assembly configuration with the advantages listed above that provides righthand as well as lefthand access to the worm to minimize inventory parts, cost, and tooling expenditures.

SUMMARY OF THE INVENTION

The present invention is a gear assembly for a power seat adjuster on a vehicle wherein the gear assembly is mounted to an upper track of the seat adjuster and couples a motor output shaft to a lead screw. The gear assembly includes a housing attached to the upper track of the seat adjuster. The housing is integrally formed by a first subhousing and a second subhousing. A first gear is rotatably mounted within the first subhousing. A second gear is carried for rotation on the lead screw and disposed within the second subhousing in meshing engagement with the first gear so that the first and second gears transmit rotation of the motor output shaft to movement of the associated lead screw.

The first gear is composed of end journals with a worm disposed therebetween. Each journal has a square aperture therein as a connecting means for a motor output shaft. The first subhousing has a general cylindrical configuration to conform to the first gear. Each end of the cylindrical subhousing has access ports to provide access means to the apertures within the journals. An adjustable supporting means is threadably attachable to at least one port of the first subhousing for supporting a journal of the first gear. The adjustable supporting means allows for adjustment of the first gear to remove lateral movement of the first gear within the first subhousing. At the same time, the adjustable supporting means allows access to the first gear so that coupling means to the motor output shaft can be attached to the first gear through either port of the first subhousing.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is an enlarged partial perspective view showing the gear assembly of the horizontal drive mechanism of the vehicle seat adjuster;

FIG. 3 is an enlarged, cross-sectional view showing the gear assembly of the horizontal mechanism;

DESCRIPTION OF THE PREFERRED EMBODIMENT

Figure 1:
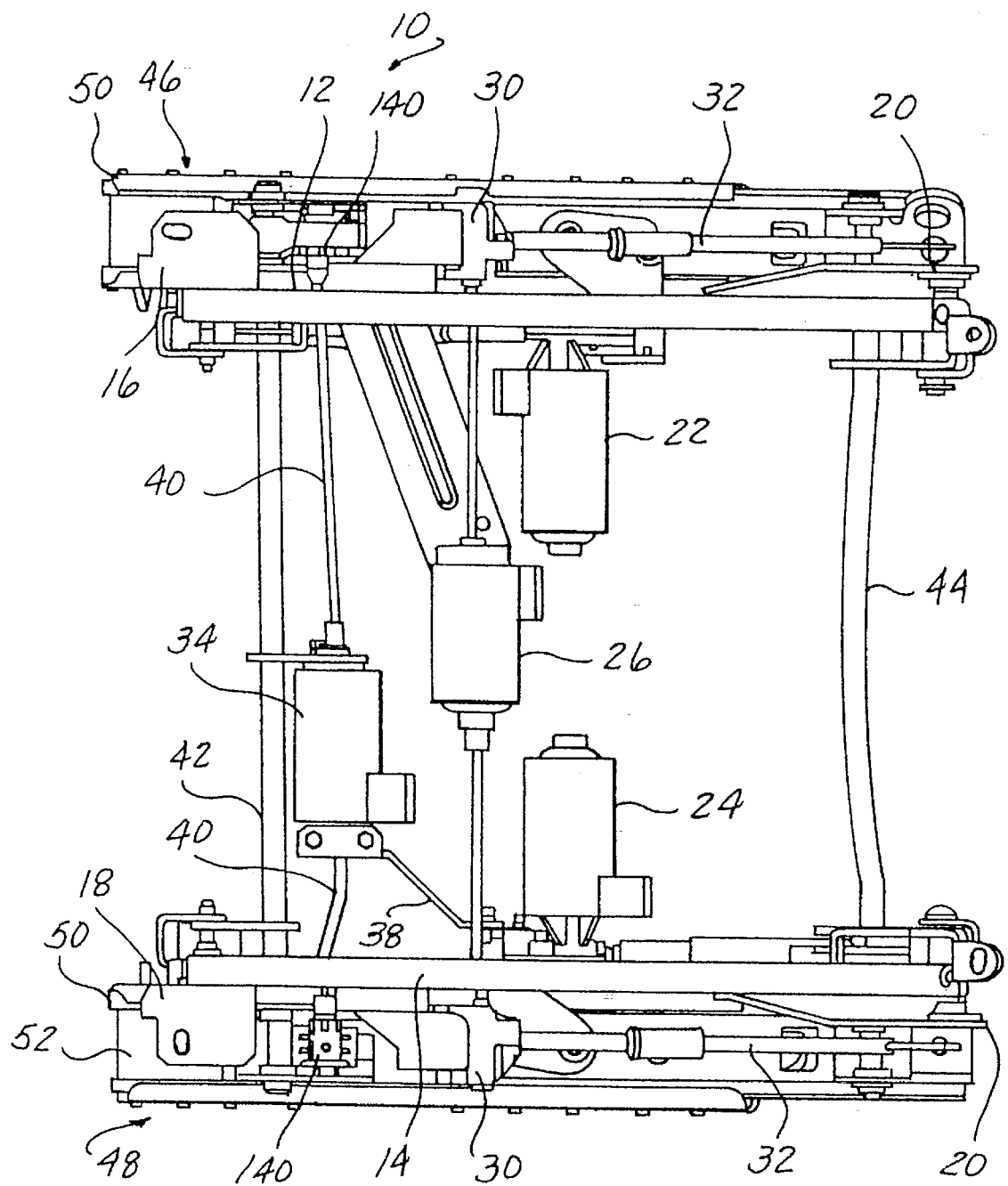
FIG. 1 is a plan view of a vehicle seat adjuster incorporating the gear assembly of the present invention.

Referring to FIG. 1, there is illustrated the power seat adjuster 10 which variably positions an automotive vehicle seat in any user selected position. The power seat adjuster 10 is a so-called "eight way" adjuster providing horizontal fore/aft and vertical up and down movement of separate front and rear portions of the adjuster as well as pivotal tilting of the seat back with respect to the seat bottom. It is understood that the present invention is employable with a power seat adjuster which includes at least a horizontal fore/aft movement and, optionally, any number of other movements.

As is conventional, the power seat adjuster 10 supports a conventional vehicle seat, not shown, which includes a seat bottom and a seat back. An upper support frame is provided on the power seat adjuster 10 for supporting and connecting a seat bottom and seat back to the power seat adjuster 10. The upper support frame includes a pair of spaced, longitudinally extending frame members or rails 12 and 14. Mounting brackets 16 and 18, for example are mounted on the ends of the frame members 12 and 14, respectively, and provide a mounting surface for connecting the seat bottom to the upper support frame. A pair of hinge plates 20 are also mounted on the upper support frame or upper tracks 52 and provide a pivot connection between the seat back and seat bottom to permit selective tilting or pivotal movement of the seat back with respect to the seat bottom as is typical in so-called "seat recliners".

Various drive assemblies are mounted on the power seat adjuster 10 to provide selective movement of the power seat adjuster 10 along various axes. For example, front and rear vertical drive motors 22 and 24, respectively, are mounted on the power seat adjuster 10 and connected to conventional lead screws and drive blocks or nuts to move front and rear portions of the vehicle seat to provide selective vertical adjustment of the front and rear portions of the vehicle seat. In addition, a recliner drive motor 26 is interconnected by a pair of rotatable drive shaft gear box assemblies 30 which are each coupled to a lead screw 32. The lead screws 32 are connected to the lower portion of the seat back frame, not shown, to provide selective pivotal adjustment of the seat back with respect to the seat bottom.

In particular, a horizontal drive means is formed of a bi-directional electric motor 34 which is fixedly mounted to one of the upper tracks 52 by means of a suitable bracket 38. A pair of rotatable output shafts 40 extend outward from the horizontal drive motor 34 to a rotatable connection with a lead screw 144 by a gear means 140 mounted in each track assembly. The output shafts 40 are flexible steel shafts covered by a polyurethane sleeve. The power seat adjuster 10 optionally includes a pair of tubular torsion tubes 42 and 44 which extend between and are connected to the opposed track assemblies 46 and 48 and provide a rigid support structure for the power seat adjuster 10.

In FIG. 2, there is depicted a detailed illustration of a portion of the horizontal drive means which moves an upper track 52 in either direction along the lower track 50. A gear assembly denoted generally by reference number 140 is mounted beneath the central raised portion of the upper track adjacent the first end of the upper track.

Figure 4:
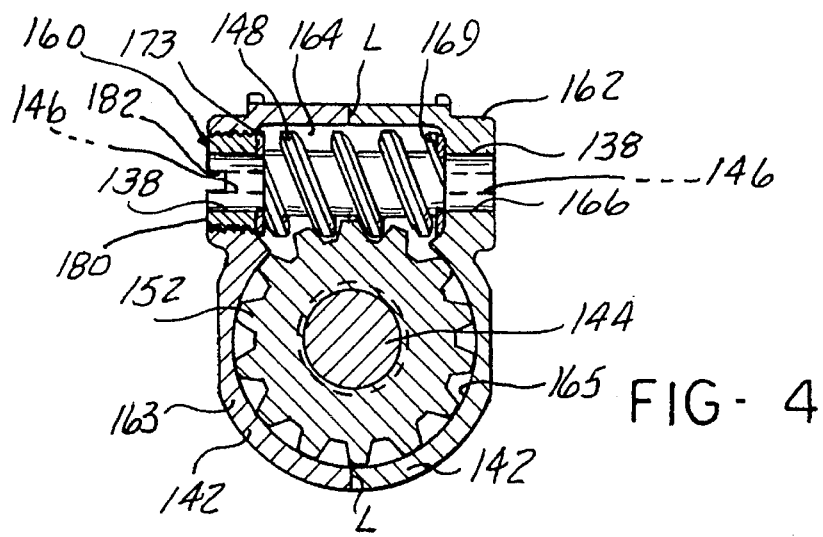
FIG. 4 is the gear assembly taken along lines 4—4 in FIG. 3.

Looking at FIGS. 2–4, the gear assembly includes a lightweight plastic housing 142 which surrounds internal gears. The plastic housing 142 is constructed of a pair of housing halves as indicated by vertical seam L in FIG. 4. Once the internal gears are set in place within the housing halves, the seam (L) is sealed by conventional means, such as by screws or retaining rings. The plastic housing 142, once sealed, forms an upper subhousing 162 open and integral to a lower subhousing 163. Each subhousing 162 and 163, contain internal cavities 164 and 165 respectively for the containment of the internal gears.

The internal gears translate rotation of the horizontal drive motor drive shaft 40 to rotation of a perpendicularly oriented horizontal lead screw 144. By way of example only, a worm 148 and a worm gear 152 are mounted within the cavities of housing 142 of the gear box. A substantially square aperture 146 is formed at both ends of the worm 148 in journals 138 extending therefrom. Square aperture 146 functions to receive an end of the horizontal drive motor output shaft. The worm 148 and its associated journals 138 are configured to accept ends of drive shafts at either end journal 138 of the worm 148. The worm 148 located within cavity 164 of upper subhousing 162 meshingly engages a helix thread formed on the worm gear 152 mounted on one end of the lead screw 144. The worm gear 152 located within cavity 165 of lower subhousing 163 is insert molded about a knurled end portion of the lead screw 144 as shown in FIG. 2. A metallic washer 154 is optionally welded to the end portion of the lead screw 144 within the worm gear 152, as shown in FIG. 3, to provide additional strength to the gear assembly. A mounting pin 156 extends through a bore 158 in the housing 142 and engages opposed side walls of the upper track 52 to mount the gear assembly 140 to the upper track 52.

The worm gear 152 may also be carried or mounted for rotation on the lead screw 144 by an internally threaded bore in the worm gear 152 which receives the lead screw 144 and axially translates the lead screw 144 upon rotation of the worm gear 152.

FIGS. 3–5A show an adjustable supporting means 160 in the form of an adjustable set bearing which is selectively attachable to upper subhousing portion 162. The adjustable set bearing 160 is made of a rough durable thermoplastic material, preferably an acetal copolymer or monopolymer. An example of a suitable material is CELCON M-90 which is commercially available from Hoechst Celanese.

At one end of upper subhousing 162 is an open access port 166 to the square aperture 146 in the journal 138 of the worm 148. The access port 166 has a stationary bearing surface integral with the upper subhousing 162. The stationary bearing surface 166 has an inner annular flat surface 168 having a thrust washer 169 juxtaposed in facial contact therewith. Thrust washer 169 provides a low friction surface between the plastic housing 142 and the journal 138 of the worm 148. When the worm 148 is installed, the thrust washer 169 is proximate against an annular planar end 171 of the worm 148 to allow rotatable movement of worm 148 within the cavity 164. The stationary bearing surface 166 has a clearance diameter to accommodate the journal 138 and to allow rotation of journal 138 within the access port 166.

At the opposite end of the upper subhousing 162, there is an open access port 170 for access to the square aperture 146 formed in opposing journal 138 at the other end of worm 148. This second port 170 has a larger diameter than stationary bearing surface 166 to accommodate the selective installation of the adjustable set bearing 160.

An inner diameter of the second port 170 is threaded to accommodate and position the adjustable set bearing 160. Just as on the opposing side of worm 148, a thrust washer 173 is disposed in facial contact with an annular planar end 171 of worm 148 to provide a low friction surface between the plastic housing 142 and the journal of the worm 148 so as to allow rotatable movement of worm 148 within cavity 164.

The adjustable supporting means 160 shown clearly in FIGS. 4 and 5 provides a support bearing for one end journal 138 of worm 148. The adjustable set bearing 160 has a threaded outer surface 174 to selectively and threadably attach within second port 170 of the upper subhousing 162. An inner through aperture 176 of the adjustable set bearing 160 has a smooth surface and a clearance diameter to accommodate an end journal 138 of the worm and to allow rotation of journal 138 within access port 170.

Figure 5A:
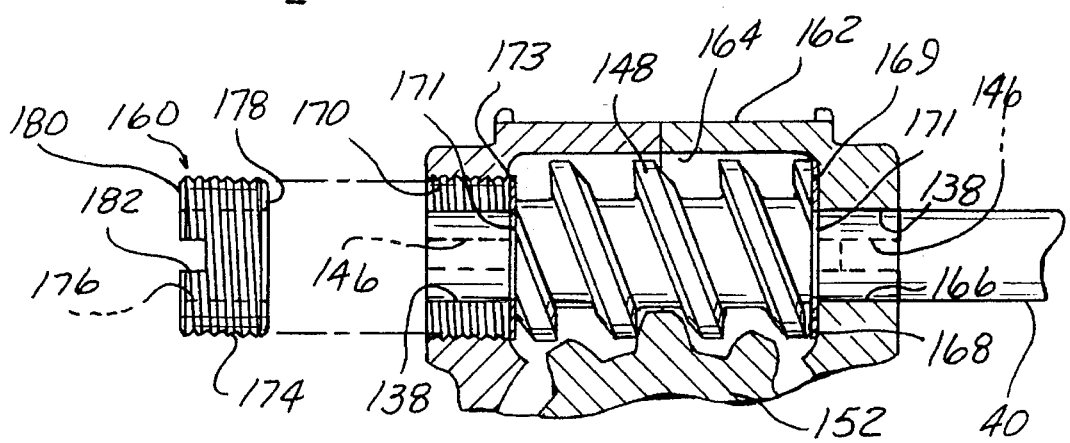
FIG. 5A is an exploded side view of the set bearing and gear assembly housing.
Figure 5B:
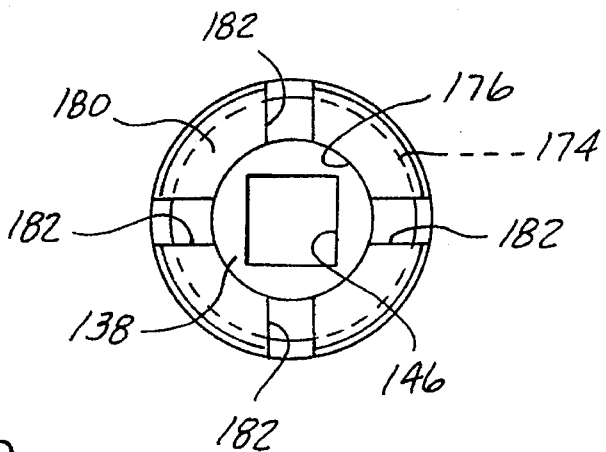
FIG. 5B is an enlarged end view of the set bearing.

One end 178 of the adjustable set bearing 160 has a flat ring-shaped face that when installed within the threaded access port 170 abuts and is proximate with the thrust washer 173 to allow relational movement of the worm 148. In FIG. 5B, the opposing end 180 of the adjustable set bearing 160 is shown showing access to a square aperture 146 located at the end of a journal 138. End 180 is preferably notched equidistantly around a ring-shaped face. The notches 182 preferably have a sufficient depth and width to accommodate a standard screw driver or other appropriate adjustment tool to facilitate the adjustment of the adjustable set bearing 160.

Within the worm cavity 164, worm 148 is sandwiched between thrust washer 173 proximate the flat ring-shaped surface 178 of the adjustable set bearing 160 and thrust washer 171 proximate the annular flat surface 168 of the stationary bearing 166. The worm 148 is adjustably and controllably held within these constraints to essentially eliminate side to side movement within upper subhousing 162 to help minimize noise and vibration transmission to the user of the seat. The through aperture 170 in adjustable set bearing 160 allows access to the square slot 146 of the worm journal 138 so that coupling to a drive mechanism is available from both ends of the worm. As a result of selectable access to the worm, the housing and gear assembly may be used on both the righthand side track as well as the lefthand side track of the seat adjuster. This flexibility minimizes inventory parts, cost and tooling expenditures.

It is apparent to those skilled in the art that the integral stationary bearing 166 may be replaced with another adjustable set bearing 160 so that both end journals 138 are located within adjustable bearings 160, although having one adjustable bearing end provides adequate controllability of the worm 148.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A gear assembly for coupling a rotatable drive shaft to a rotatable driven shaft comprising:

a housing;

a first gear rotatably mounted in the housing and having connecting means to the rotatable drive shaft, said first gear having a pair of end journals and a worm disposed therebetween;

a second gear carried for rotation on the driven shaft and disposed within the housing in meshing engagement with the first gear, the first and second gears transmitting rotation of the rotatable drive shaft to movement of the associated rotatable driven shaft; and adjustable supporting means for supporting at least one end journal of the first gear wherein connecting means are formed on each end journal for connecting to the rotatable driven shaft and said each connecting means is exposed externally from said housing.

2. The gear assembly of claim 1 wherein said adjustable supporting means has an inner smooth surface for receiving and supporting an end journal of the first gear.

3. The gear assembly of claim 2 wherein said housing has an open access port to at least one end journal having a threaded cylindrical inner surface, and the adjustable support means has a threaded cylindrical outer surface for threadable engagement to the threaded cylindrical inner surface of the open access port.

4. The gear assembly of claim 3, wherein said adjustable supporting means has a through aperture for providing access through the adjustable supporting means to the connecting means on the end journal.

5. The gear assembly of claim 1, wherein said adjustable supporting means has a through aperture for providing access through the adjustable supporting means to the connecting means on the end journal.

6. The gear assembly of claim 1, wherein said adjustable supporting means is releasably attachable to the housing.

7. The gear assembly of claim 6 wherein said housing has an open access port to at least one end journal having a threaded cylindrical inner surface, and the adjustable support means has a threaded cylindrical outer surface for threadable engagement to the threaded cylindrical inner surface of the open access port.

8. The gear assembly of claim 1 wherein said gear assembly is mounted on a power seat adjuster, the first gear is coupled to a motor drive shaft, and the second gear is coupled to a perpendicularly oriented lead screw.

9. The gear assembly of claim 8, wherein said adjustable supporting means is releasably attachable to the housing.

10. The gear assembly of claim 9, wherein said housing has an open access port to at least one journal having a threaded cylindrical inner surface and the adjustable supporting means has a threaded cylindrical outer surface for threadable engagement to the threaded cylindrical inner surface of the open access port.

11. The gear assembly of claim 8, wherein the adjustable supporting means is an adjustable set bearing.

12. The gear assembly of claim 11, wherein the adjustable set bearing is formed of a plastic material.

13. The gear assembly of claim 11, wherein said adjustable set bearing has a first end and a second end, said first end having a planar surface for coupling engagement with said worm, said second end having driving means for threading the adjustable set bearing relative to the housing.

14. The gear assembly of claim 11, wherein a port in the housing has a threaded cylindrical inner surface and the adjustable set bearing has a threaded cylindrical outer surface for the threadable engagement in the threaded inner surface of the port.

15. The gear assembly of claim 1 wherein:

the adjustable supporting means is releasibly attachable to the housing and has a through aperture for providing access to the connecting means on the end journal.

16. The gear assembly of claim 1, wherein the adjustable supporting means extends the length of the journal.

17. The gear assembly of claim 16, wherein the pair of end journals have essentially equal lengths and each end journal is configured for receiving the adjustable supporting means.

18. The gear assembly of claim 16, wherein a thrust washer is disposed in facial contact with an annular planar end of the worm.

19. The gear assembly of claim 1, wherein the connecting means is a square aperture for receiving an end of the rotatable driven shaft.

20. The gear assembly of claim 1, wherein the adjustable supporting means is essentially mounted entirely within the housing.

* * * * *